US006820548B2

(12) United States Patent
Lepeltier et al.

(10) Patent No.: US 6,820,548 B2

(45) Date of Patent: Nov. 23, 2004

(54) INFEED ELEMENT FOR DRAWING IN A MATERIAL WEB

(75) Inventors: Patrick Lepeltier, Angicourt (FR); Jean-Claude Marmin, Estees-Saint-Denis (FR)

(73) Assignee: Heidelberger Druckmaschinen AG, Heidelberg (DE)

(*) Notice: Subject to any disclaimer, the term of this patent is extended or adjusted under 35 U.S.C. 154(b) by 34 days.

(21) Appl. No.: 10/076,979

(22) Filed: Feb. 15, 2002

(65) Prior Publication Data

US 2002/0108515 A1 Aug. 15, 2002

(30) Foreign Application Priority Data

Feb. 15, 2001 (DE) ........................................ 101 06 946

(51) Int. Cl.$^{7}$ ............................ B41F 13/54; G03B 1/56

(52) U.S. Cl. ............................ 101/228; 226/91; 226/92

(58) Field of Search ............................ 101/228; 226/91, 226/92

(56) References Cited

U.S. PATENT DOCUMENTS 4,480,801 A * 11/1984 Stone .......................... 242/56
4,706,862 A * 11/1987 Theilacker .................... 226/92
4,987,830 A * 1/1991 Fukuda et al. .............. 101/228
5,052,295 A * 10/1991 Suzuki et al. ............... 101/227
5,365,843 A * 11/1994 House et al. ............... 101/228
6,240,843 B1 * 6/2001 Kruger et al. .............. 101/232
6,477,949 B2 * 11/2002 Metrope ...................... 101/228

FOREIGN PATENT DOCUMENTS

DE 198 37 362 A1 2/2000
EP 1 060 880 A2 12/2000
GB 2 315 062 A 1/1998

* cited by examiner

*Primary Examiner*—Daniel J. Colilla
*Assistant Examiner*—Marvin P. Crenshaw
(74) *Attorney, Agent, or Firm*—Laurence A. Greenberg; Werner H. Stemer; Ralph E. Locher

(57) ABSTRACT

An infeed device for drawing a material web into a web-fed rotary printing machine in an infeed direction includes an infeed channel, an infeed element guidable in the infeed channel, and an infeed triangle releasably connectable to the infeed element, the infeed triangle having fastened thereto a leading end of the material web to be drawn into the rotary printing machine, and the infeed triangle having, on a side thereof facing towards the infeed channel, a deformation extending at least approximately perpendicularly to the infeed direction.

10 Claims, 3 Drawing Sheets

INFEED ELEMENT FOR DRAWING IN A MATERIAL WEB

BACKGROUND OF THE INVENTION

Field of the Invention

The invention relates to an infeed element for drawing in a material web, such as, for example, a material web capable of being printed on one or more sides, into a web-processing rotary printing machine.

The published European Patent Document EP 1 060 880 A1 is concerned with a device for drawing a material web into a rotary printing machine. An infeed triangle is provided, which has a side of predetermined length, an underside and a hypotenuse. Furthermore, a guide is provided, which serves for guiding the infeed triangle. The guide is releasably fastened to the infeed triangle at least approximately along the entire predetermined length of one side of the latter.

The published British Patent Document GB 2 315 062 A is concerned with a web infeed element configured as a right-angled triangle. The web infeed element is of flat construction and has surfaces between which a reinforcing fabric is embedded. The reinforcing fibers of the latter extend at least approximately parallel to one another and perpendicularly to the hypotenuse. The infeed element is provided on the base side thereof with a suspension device including a foldable segment. The web infeed element has at an apex or tip thereof a lug or eye for suspending the web infeed element on a pulling device. The foldable segment and the lug are welded to the web infeed element preferably by ultrasonic welding.

Web infeed elements heretofore known from the prior art and configured at least approximately as right-angled triangles are formed of an extremely flat material having high tensile strength. They are capable of being suspended with the long leg of the triangle on a suspension device capable of being moved in a channel provided with a longitudinal slot or cut and by which the infeed device is threaded along the predetermined conveying path through the components, such as printing units, a drier, a cooling-roller housing, a turning-bar superstructure and the like, of a web-fed printing machine.

Due to the asymmetric introduction of force into the web infeed element, the latter tends to be rotated with the base thereof into the longitudinal slot of the infeed device, which may result in damage.

SUMMARY OF THE INVENTION

In view of the devices of the foregoing general type heretofore known from the prior art, it is an object of the invention of the instant application to provide an infeed element for drawing in a material web, the infeed element itself being prevented from running into a web infeed device.

With the foregoing and other objects in view, there is provided, in accordance with the invention, an infeed device for drawing a material web into a web-fed rotary printing machine in an infeed direction, comprising an infeed channel, an infeed element guidable in said infeed channel, and an infeed triangle releasably connectable to the infeed element, the infeed triangle having fastened thereto a leading end of the material web to be drawn into the rotary printing machine, and the infeed triangle having, on a side thereof facing towards the infeed channel, a deformation extending at least approximately perpendicularly to the infeed direction.

In accordance with another feature of the invention, the infeed device includes a deformation element for forming the deformation.

In accordance with a further feature of the invention, the deformation element extends parallel to the side of the infeed triangle facing towards the infeed channel.

In accordance with an added feature of the invention, the deformation has a form selected from the group thereof consisting of wave forms and sawtooth forms.

In accordance with an additional feature of the invention, the deformation formed in the infeed triangle has a height exceeding the width of the channel slot formed in the infeed channel and through which the infeed element extends outwardly.

In accordance with yet another feature of the invention, the deformation element is formed as a profiled flexible metallic rail.

In accordance with yet a further feature of the invention, the deformation element, as viewed in the infeed direction, has a series of elevations and depressions.

In accordance with yet an added feature of the invention, the deformation element has a length exceeding the width thereof by a multiple.

In accordance with yet an additional feature of the invention, the deformation element is formed as a sidewise disposed U-shaped profile and is slidable laterally onto the infeed triangle.

In accordance with a concomitant feature of the invention, the deformation element is fastenable to a side of the infeed triangle selected from the group consisting of an upper side and an underside thereof.

Advantages achievable by the infeed device according to the invention are provided primarily by a wavy or wave-shaped profile formed in the infeed triangle in a rear region thereof by a deformation element which mountable in a relatively simple manner, and of attachable, for example, laterally in the rear region of the infeed triangle. The at least approximately wave-shaped deformation in the infeed triangle extends perpendicularly to the infeed direction of the material web and is produced with an absolute height which, when force is introduced asymmetrically into the infeed triangle, effectively prevents the rear region of the triangle, as well as the material web to be fed or drawn in, which is received on the triangle, from being rotated into the gap or notch of the infeed device, which extends parallel to the web infeed plane.

In a preferred development of the concept upon which the invention is based, the deformation element is disposed on the infeed triangle in a region facing a base side of the infeed triangle. The deformation element may also be constructed as a horizontal U-shaped profile open at one side and slidable laterally, in the rear region, onto the long side of the infeed triangle, the long side extending parallel to the infeed channel. The location at which a deformation extending transversely to the infeed device is imparted to the infeed triangle can consequently be selected freely.

The deformation element extends, on the infeed triangle, preferably parallel to the side thereof facing in the draw-in or infeed direction. A preferably wave-shaped deformation characterized by a series of elevations and depressions is imparted by the deformation element perpendicularly to the infeed direction to the infeed triangle in the rear region thereof.

The height of the deformation imparted to the infeed triangle perpendicularly to the draw-in or infeed direction, on the side of the triangle facing towards the channel slot of the infeed channel, preferably exceeds that width of the channel slot of the infeed channel through which there runs the infeed element movably received in the infeed device.

The deformation element may be constructed, for example, as a profiled flexible metallic rail, the thickness of which is only a few tenths of a millimeter. A series of elevations and depressions, which forms a wavy or wave-shaped profile in the deformation element, may be formed, as viewed in the infeed direction, on the deformation element which is produced, for example, of metal. The length of the deformation element exceeds the width thereof preferably by a multiple, so that, when the deformation element is mounted on that side of the web infeed or draw-in triangle which faces the infeed direction, a relatively long region on the infeed triangle can be subjected to a wavy or wave-shaped deformation, in order to prevent the triangle from running into the channel slot, which extends parallel to the infeed direction, and through which the movable infeed element passes.

The deformation element may also be produced as a metallic rail which may be mounted on the upper side or the underside in the rear region of the infeed triangle; in addition, it is possible for the deformation element, as a horizontal U-shaped profile, to be provided with a series of depressions and elevations, so that the deformation element can simply be slid with the open end thereof onto the infeed triangle on the side of the latter extending parallel to the infeed channel. Besides producing the deformation element from metallic material, it is also conceivable to produce it from a flexible material, such as, for example, elastic plastic material or the like. The deformation, as such, can also be impressed into an infeed triangle, by which a material web to be drawn-in can be threaded along the respective conveying path into the components of a web-processing and material-processing rotary printing machine.

Other features which are considered as characteristic for the invention are set forth in the appended claims.

Although the invention is illustrated and described herein as embodied in an infeed element for drawing in a material web, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

BRIEF DESCRIPTION OF THE DRAWINGS

FIG. 2.1 is an enlarged fragmentary, side elevational view of FIG. 2, showing the infeed channel;

FIG. 3.1 is an enlarged fragmentary, side elevational view of FIG. 3 showing a profiled deformation element causing the deformation of the infeed triangle.

DESCRIPTION OF THE PREFERRED EMBODIMENTS

Figure 1:
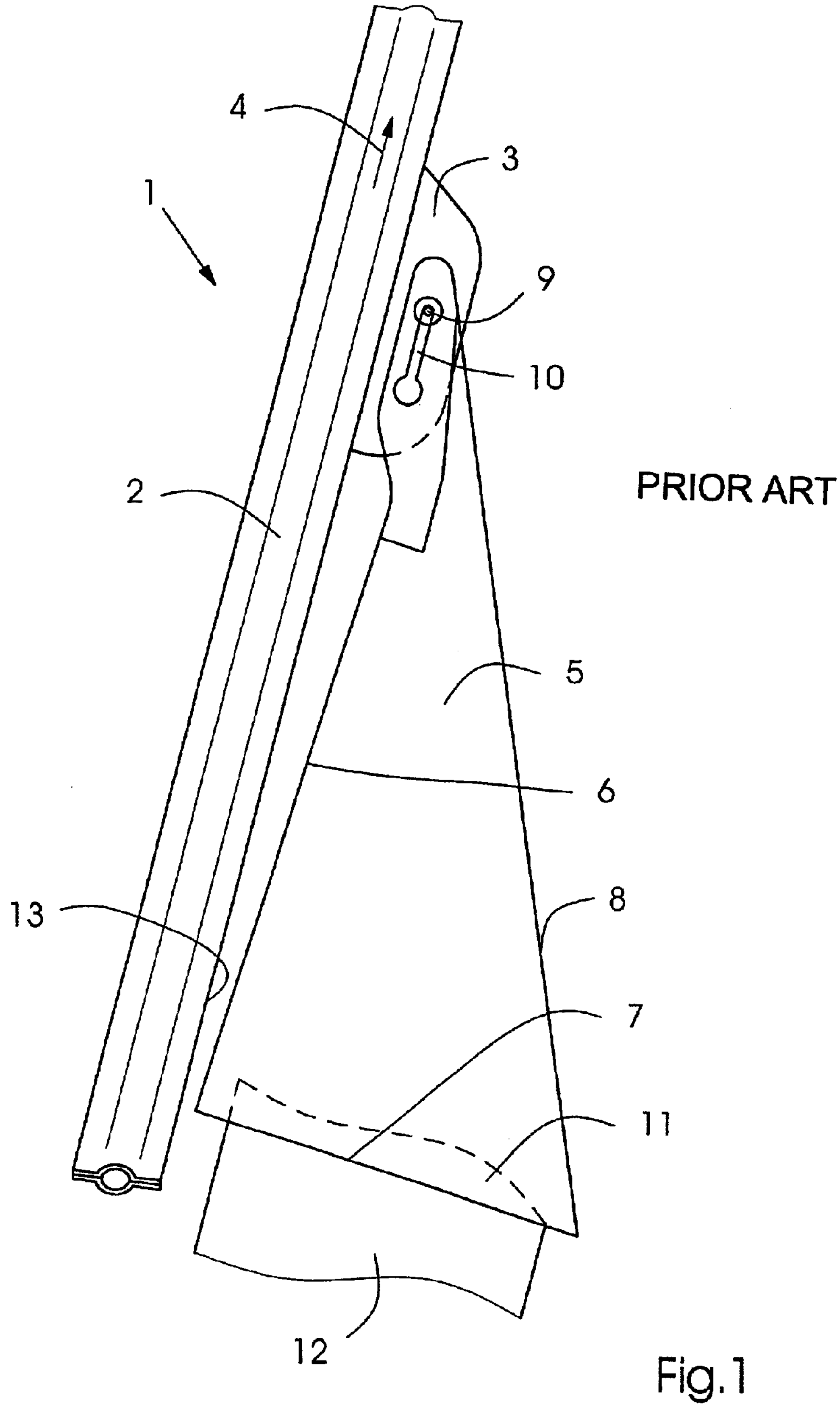
PRIOR ART Fig. 1
FIG. 1 is a top plan view of an infeed triangle fastened to a an infeed device.

Referring now to the drawings and, first, particularly to FIG. 1 thereof, there is reproduced therein, in a top plan view, an infeed triangle according to the prior art, which is fastened to an infeed device.

In the greatly simplified illustration according to FIG. 1, an infeed device 1 for a material web 12 to be drawn in extends in the infeed direction 4. The infeed device 1 has an infeed channel 2 formed with a channel slot 13 on the side thereof facing towards the material web 12 to be drawn in. Received movably in the infeed channel 2 of the infeed device 1 is a tongue-shaped infeed element 3 of especially flat construction which passes through the channel slot 13 of the infeed channel 2 on the side thereof facing towards the material web 12 to be drawn in.

The apex or tip of an infeed triangle 5 is fastened at a suspension point 9 of the infeed element 3 which is received movably in the infeed channel 2. An opening slot 10 extends, adjacent to the suspension point 9, at least approximately parallel to the infeed direction 4, in the infeed element 3. The infeed triangle 5 is configured at least approximately as a right-angled triangle, a longer leg 6 of which extending parallel to the infeed device 1 in the infeed direction 4, and a material web 12 to be drawn in is fastened to the shorter leg 7 of the triangle, i.e. the base thereof, by a suitable connection 11. A hypotenuse 8 completes the infeed triangle 5 of right-angled configuration. Due to the asymmetric introduction of tensile force into the infeed triangle 5 receiving the material web 12 to be drawn in, the infeed triangle, at the base 7 thereof, tends to approach the channel slot 13 of the infeed channel 2 of the infeed device 1.

Figure 2:
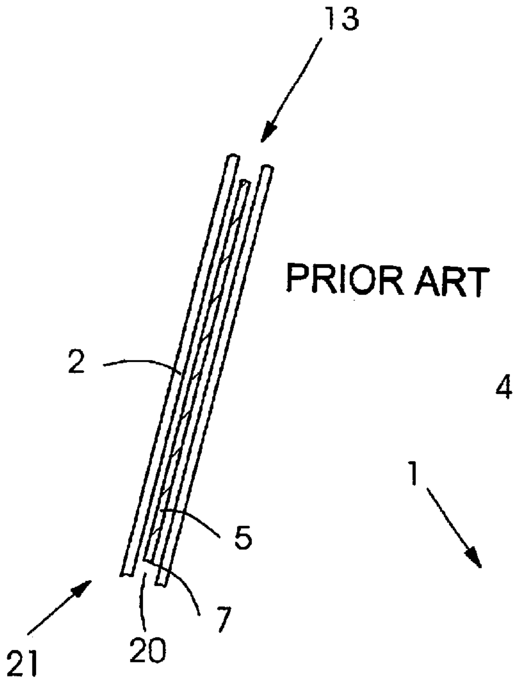
FIG. 2 is a view like that of FIG. 1 showing the infeed triangle having a tendency to run into an infeed channel of the infeed device.
Figure 2:
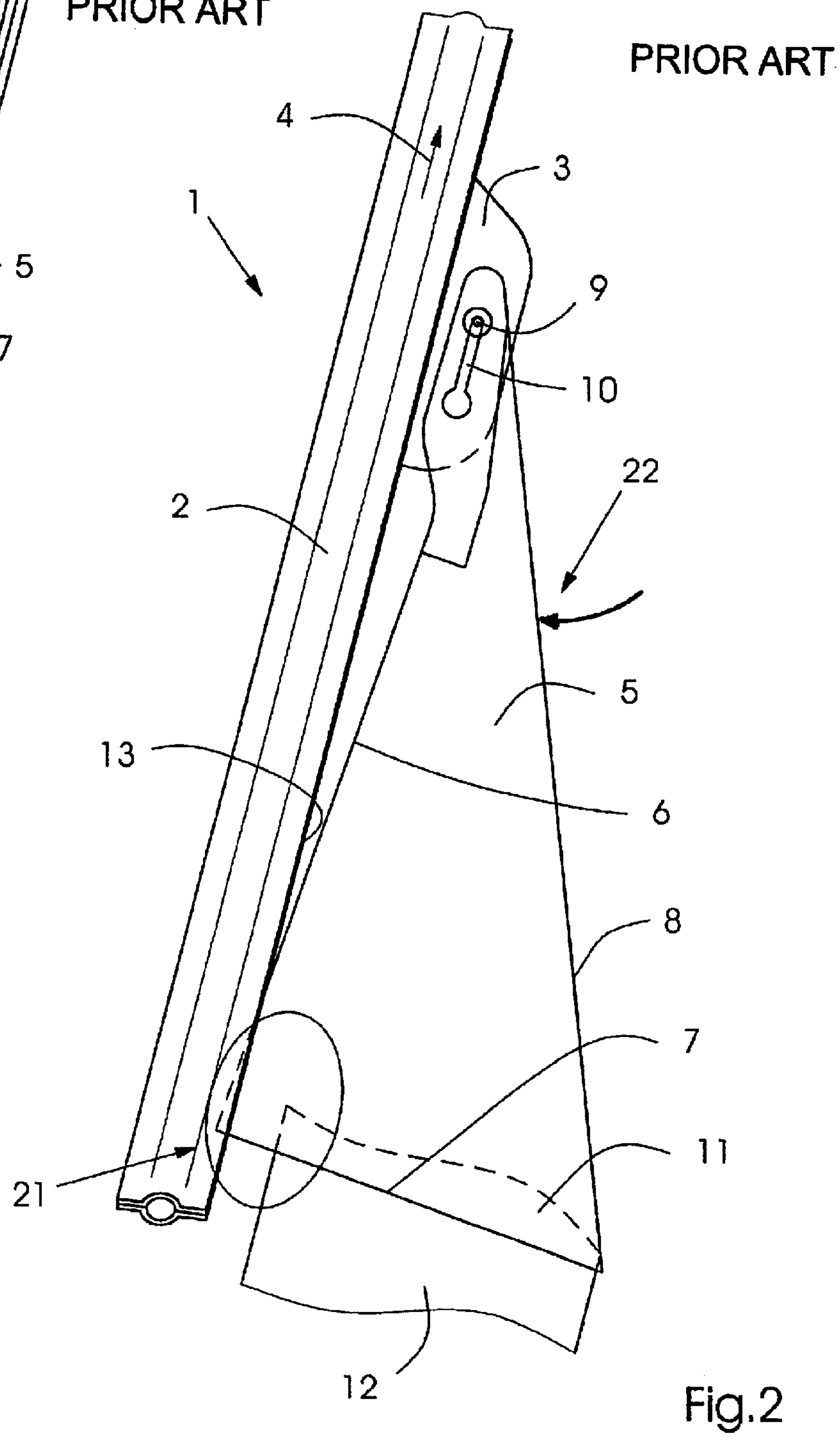

FIG. 2 shows an infeed triangle according to the prior art, which has a tendency to run into the infeed channel of the infeed device. Due to the tensile forces produced by the material web during the infeed or drawing-in operation, the infeed triangle 5 tends to rotate, as represented by the curved arrow 22, about the suspension point 9 thereof on the infeed element 3 during the movement of the infeed element 3 in the infeed channel 2 of the infeed device 1 in the infeed direction represented by the arrow 4. The long leg 6 of the infeed triangle 5 of right-angled configuration may consequently be introduced into the channel slot 13 of the infeed channel 2 at the location 21, with the result that the infeed triangle 5 may become jammed in the open channel slot 13 facing towards the long leg 6 of the infeed triangle 5; parts of the infeed element 5 may remain in the channel slot 13, so that, in the case of the infeed triangle 5 having a flat form of construction, jamming thereof may readily occur when the infeed element passes, for example, a curved portion of the infeed path following a straight portion thereof.

FIG. 2.1 is an enlarged fragmentary side elevational view of FIG. 2 showing part of the infeed channel 2 according to the prior art.

At the infeed location 21, the infeed triangle 5 tends to be rotated with the base 7 thereof into the open channel slot 13 of the infeed channel 2, the channel slot 13 facing towards the material web 12 to be drawn or fed in. It is believed to be readily apparent from this illustration that the channel width 20 of the channel slot 13 of the infeed device 2 exceeds the thickness of the infeed element 5.

Figure 3:
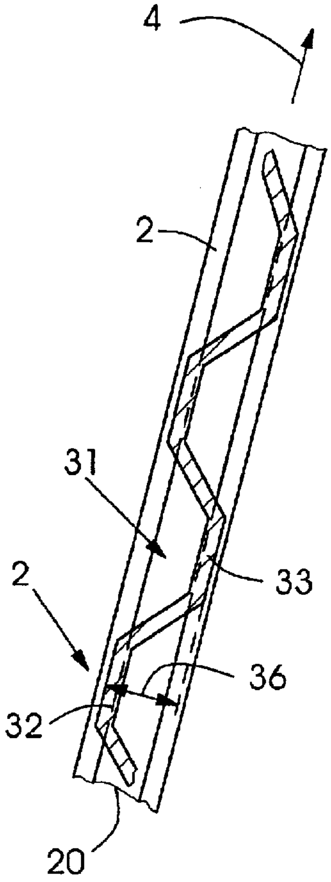
FIG. 3 is another view like those of FIGS. 1 and 2, showing the infeed triangle deformed in accordance with the invention.
Figure 3:
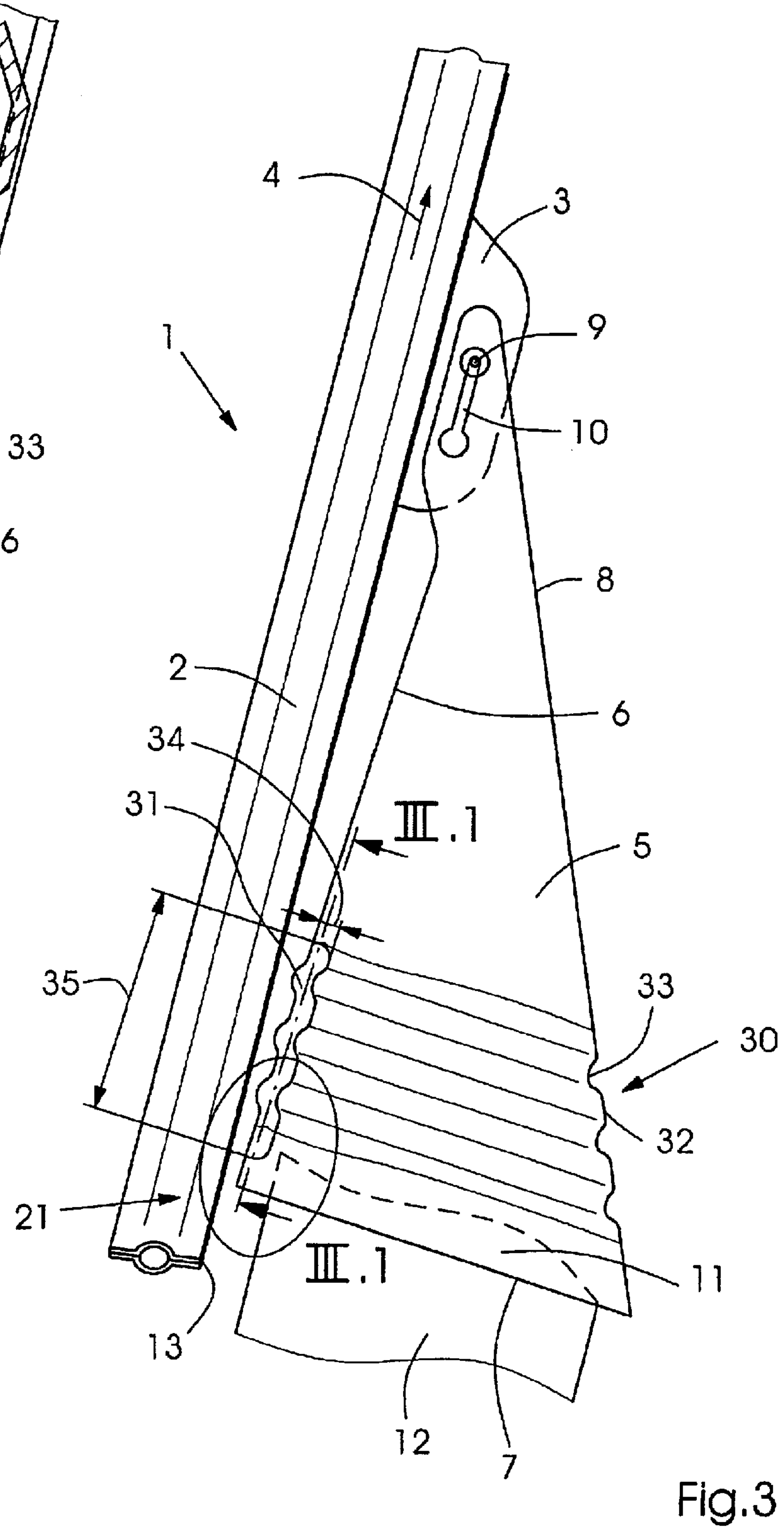

An infeed triangle deformed according to the invention is shown in greater detail in FIG. 3.

In an embodiment of the invention, a deformation element 31 is shown fastened to the infeed triangle 5, preferably formed as a right-angled triangle, in a rear region thereof. The deformation element 31 is thus mounted on the infeed triangle 5, in a rear region thereof, and extends parallel to the long leg 6 of the triangle 5 and, preferably, parallel to the infeed device 4. A deformation 30 can consequently be imparted to the infeed triangle 5 in a region facing towards the base side 7, the material web 12 to be drawn-in being received in that region at a connection location 11. In the example provided in FIG. 3, the deformation takes the form of a series of successive depressions 33 and elevations 32, which extends in the infeed triangle 5 in the infeed direction represented by the arrow 4. A deformation 30 which, in a side elevational view (note FIG. 3.1), extends in wave form or sawtooth form, is consequently is set or established in the rear region of the infeed triangle 5.

The deformation element 31 may be formed as a metallic rail, the length 35 of which exceeding the width 34 of the deformation element 31 by a multiple. Besides a metallic rail having a wave-shaped profiling as a deformation element 31, it is also possible to manufacture the deformation element 31 from plastic or a flexible material; if the deformation element 31 is formed, for example, as a sidewise disposed U-shaped profile, it can be pushed or slid, in a relatively simple manner, onto the long leg 6 of the infeed triangle 5, and provides the latter with a wave-shaped profiling 30, the absolute height 36 of which, according to the invention, exceeds the width 20 of the channel slot 13 of the infeed channel 2. This ensures that, when force is introduced asymmetrically at the suspension point 9 into the infeed triangle 5 configured at least approximately as a right-angled triangle, the rotation that results does not cause the long leg 6 of the infeed triangle 5 to run at the run-in point 21 into the channel slot 13 facing the long leg 6. Operating faults or even damage to the infeed triangle 5 can thus be avoided reliably, without requiring the infeed triangle 5 to have excessive rigidity which would otherwise overly restrict the freedom of movement thereof when passing curved portions of the path traversed thereby.

A profile effecting the deformation of the infeed triangle is shown in greater detail in FIG. 3.1, in an enlarged side elevational view, partly in section.

A series of depressions 33 and elevations 32 are arranged, as viewed in the infeed direction represented by the arrow 4, on the deformation element 31. The height and the depth 36, respectively, of the individual depressions 33 and the elevations 32, respectively, is in this regard preferably dimensioned so that they exceed the width 20 of the channel slot 13 of the infeed channel 2, so that an infeed or entry of the deformation element 31 itself or an infeed or entry of a rear region of an infeed triangle 5 that is provided with such a deformation element 31 into the channel slot 13 of the infeed channel 2 is effectively prevented.

When the deformation element 31 is manufactured, for example, from steel which is only a few tenths of a millimeter thick, it has a flexibility which makes it possible for the infeed triangle 5 provided with the deformation element 31 to be threaded in, even around small radii, so that, for example, the threading of a material web 12 to be drawn in or infed into a turning-bar superstructure is assured without difficulty. The flexibility inherent in the deformation element 31 allows the deformation element 31 to resume the original shape thereof, should it inadvertently have experienced high mechanical stress, such as, for example, a run or entry into cylinder gap between two transfer cylinders in a printing unit of a rotary printing machine.

We claim:

1. An infeed device for drawing a material web into a web-fed rotary printing machine in an infeed direction, comprising an infeed channel having a channel slot formed therein, an infeed element guidable in said channel slot, and an infeed triangle releasably connectable to said infeed element, said infeed triangle having fastened thereto a leading end of the material web to be drawn into the rotary printing machine, and said infeed triangle having, on a leg thereof facing towards said infeed channel, a deformation extending at least approximately perpendicularly to the infeed direction, said deformation preventing said infeed triangle from entering said channel slot.

2. The infeed device according to claim 1, including deformation element for forming said deformation.

3. The infeed device according to claim 2, wherein said deformation element extends parallel to said leg of said infeed triangle facing toward said infeed channel.

4. The infeed device according to claim 1, wherein said deformation has a form selected from the group thereof consisting of wave forms and sawtooth forms.

5. The infeed device according to claim 2, wherein said deformation element is formed as a profiled flexible metallic rail.

6. The infeed device according to claim 2, wherein said deformation element, as viewed in the infeed direction, has a series of elevations and depressions.

7. The infeed device according to claim 2, wherein said deformation element has a length exceeding the width thereof by a multiple.

8. The infeed device according to claim 2, wherein said deformation element is formed as a sidewise disposed U-shaped profile and is slidable laterally onto said infeed triangle.

9. The infeed device according to claim 2, wherein said deformation element is fastenable to a side of said infeed triangle selected from the group consisting of an upper side and an underside thereof.

10. An infeed device for drawing a material web into a web-fed rotary printing machine in an infeed direction, comprising an infeed channel having a channel slot formed therein defining a width of said channel slot, an infeed element extending outwardly through said channel slot and being guidable in said channel slot, an infeed triangle releasably connectable to said infeed element, said infeed triangle having a leading end of the material web to be drawn into the rotary printing machine fastened thereto, and said infeed triangle having a deformation extending at least approximately perpendicularly to the infeed direction on a leg thereof of said infeed triangle facing towards said infeed channel, said deformation having a height exceeding said width of said channel slot formed in said infeed channel.

* * * * *